United States Patent
Hussain et al.

(10) Patent No.: US 10,006,372 B2
(45) Date of Patent: Jun. 26, 2018

(54) VENTILATION INLET

(71) Applicant: ROLLS-ROYCE PLC, London (GB)

(72) Inventors: Zahid M Hussain, Derby (GB);
Nityabh Mishra, Derby (GB); Peter T Ireland, Oxford (GB)

(73) Assignee: ROLLS-ROYCE plc, London (GB)

( * ) Notice: Subject to any disclaimer, the term of this patent is extended or adjusted under 35 U.S.C. 154(b) by 178 days.

(21) Appl. No.: 14/748,787

(22) Filed: Jun. 24, 2015

(65) Prior Publication Data
US 2016/0010558 A1    Jan. 14, 2016

(30) Foreign Application Priority Data

Jul. 11, 2014    (GB) .................................. 1412379.8

(51) Int. Cl.
| | |
|---|---|
| *F02C 7/25* | (2006.01) |
| *F01D 17/10* | (2006.01) |
| *F02K 3/075* | (2006.01) |
| *F02C 7/042* | (2006.01) |
| *F02C 9/18* | (2006.01) |

(52) U.S. Cl.
CPC .............. *F02C 7/25* (2013.01); *F01D 17/105* (2013.01); *F02C 7/042* (2013.01); *F02C 9/18* (2013.01); *F02K 3/075* (2013.01)

(58) Field of Classification Search
CPC .... F02C 7/25; F02C 7/042; F02C 9/18; F02C 7/057; F02C 7/30; F02C 7/04; F01D 17/105; F01D 25/00; F02K 3/075
See application file for complete search history.

(56) References Cited

U.S. PATENT DOCUMENTS

| | | | |
|---|---|---|---|
| 2,206,356 A | 7/1940 | Hutchings | |
| 5,239,817 A | 8/1993 | Mildenstein et al. | |
| 2010/0096037 A1* | 4/2010 | Lee | F16L 9/18 |
| | | | 138/114 |
| 2010/0146986 A1* | 6/2010 | Hussain | F01D 25/14 |
| | | | 60/806 |

FOREIGN PATENT DOCUMENTS

| | | |
|---|---|---|
| DE | 3410078 A1 | 10/1985 |
| EP | 2297157 A1 | 7/1996 |
| EP | 1728992 A2 | 12/2006 |
| EP | 1918551 A2 | 5/2008 |

(Continued)

OTHER PUBLICATIONS

Nov. 25, 2015 Search Report issued in European Patent Application No. 15 17 3648.

(Continued)

*Primary Examiner* — Dwayne J White
*Assistant Examiner* — Justin A Pruitt
(74) *Attorney, Agent, or Firm* — Oliff PLC

(57) ABSTRACT

A ventilation inlet including a conduit (104) arranged to convey flow from a first flow zone to a second flow zone. The conduit has a mouth region (106) presenting to the first flow zone an entrance aperture to receive the flow therefrom. The conduit has a baffle (114) spanning a portion of the conduit to define a throat region (116), the throat region being narrower than the entrance aperture. The throat region (116) is movable along the conduit (104) to control the flow through the ventilation inlet.

19 Claims, 5 Drawing Sheets

(56) References Cited

FOREIGN PATENT DOCUMENTS

| | | |
|---|---|---|
| EP | 2275655 A2 | 1/2011 |
| EP | 2392776 A2 | 12/2011 |
| EP | 2 415 992 A2 | 2/2012 |
| EP | 2722509 A1 | 4/2014 |
| GB | 1166733 A | 10/1969 |
| WO | 03/060311 A1 | 7/2003 |

OTHER PUBLICATIONS

Aug. 25, 2016 Office Action issued in European Patent Application No. 15173648.5.
Jan. 22, 2015 Search Report issue din British Patent Application No. 1412379.8.

* cited by examiner

VENTILATION INLET

CROSS-REFERENCE TO RELATED APPLICATIONS

This application is based upon and claims the benefit of priority from British Patent Application Number 1412379.8 filed 11 Jul. 2016, the entire contents of which are incorporated by reference.

BACKGROUND

1. Field of the Disclosure

The present invention relates to a ventilation inlet; in particular, but not exclusively, to a ventilation inlet for a nacelle cavity of a gas turbine engine, for example a fire zone ventilation inlet.

2. Description of the Related Art

A gas turbine engine 10, to which both the present invention and the prior art ventilation inlets are applicable, is shown in FIG. 1. The engine 10 comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28.

A nacelle 30 surrounds the gas turbine engine 10 and defines, in axial flow B, a bypass duct 32. The radially inner extent of the bypass duct 32 is defined by an annular inner wall 34.

The annular inner wall 34 typically defines at least two exemplary fire zones, zone z2 and zone z3, (also referred to as a nacelle cavity) that are axially separated by a barrier wall 36. Downstream of the barrier wall 36 there is typically provided an array of ventilation inlets that are preferably equi-angularly spaced around at least a portion of the circumference of the annular inner wall 34 to permit air to flow from the bypass duct 32 into fire zone z3 to ventilate and purge it.

A prior art ventilation inlet 38 typically takes the form of a static pressure tapping, being a pipe directed radially so that it extends substantially perpendicularly to the flow through the bypass duct 32, as shown in FIG. 2.

The flow through such a prior art ventilation inlet is driven via the static-to-static pressure ratio between the bypass duct (in the region of the respective inlet opening) and the nacelle cavity. This pressure differential can be of the order of 1-1.6:1, dependent upon engine condition.

The flow rate through the ventilation inlets is a regulatory requirement to provide an 'absence of accumulation of flammable fluid vapours within the nacelle' so as to minimise the risk of fire. Furthermore, the ventilation additionally acts as a transport medium for fire extinguishant around the nacelle cavity.

The final function of this flow is to provide thermal management to engine units, accessories and the nacelle cavity boundary itself.

As can be seen from FIG. 2, the prior art ventilation inlets are of a fixed, or static, configuration and are fabricated from materials that are inherently fireproof so as to prevent increase of flow through the inlet and consequently into the nacelle cavity during a fire event, thereby exacerbating the fire. These materials are usually steel or titanium. The fixed, or static, nature of these inlets also provides a capability that is consequently not subject to reliability assessment—i.e. they are fixed geometries and nothing can malfunction.

However, a key disadvantage of the prior art ventilation inlets is that flow into the nacelle cavity, and hence the size and configuration of the ventilation inlet, must be selected to provide sufficient purging of the nacelle cavity at low power engine conditions so as to satisfy the regulatory requirements. However, selecting the size and configuration of the ventilation inlet on this basis results in an increased flow through the inlet, and thus significant over purging of the nacelle cavity, during certain flight conditions e.g. cruise. This flow excess results in a disadvantageous effect on specific fuel consumption and the propulsive efficiency of the engine 10.

OBJECTS AND SUMMARY

Accordingly, the present invention presents a ventilation inlet as set forth in claim 1, which allows the flow through the ventilation inlet to be modified, e.g. regulated, in response to a change in the flow conditions (e.g. flow rate and/or pressure) in the first flow zone; for example, a change in the flow conditions occurring as a consequence of a change in engine conditions. The baffle and/or throat region may be said to be moveable within (and optionally moveable only within) the conduit.

In particular, the present invention allows for the flow delivered to the second flow zone to be actively, and controllably, restricted when desired. For example, during certain high power engine conditions such as cruising.

The baffle is preferably (reversibly) movable along the conduit. The baffle may be (reversibly) movable along the general direction of flow in the conduit (104).

The baffle is locatable in a first position, in which the baffle is located downstream of the mouth region, to be recessed from the entrance aperture. In this configuration a relatively high, even a maximum, flow through the ventilation inlet is obtainable. Indeed, in this configuration, the flow through the ventilation inlet is increased relative to a ventilation inlet having the same configuration and dimension of conduit, but without the baffle. The flow may be increased by up to 20% by providing a baffle member in the conduit recessed from the entrance aperture of the mouth region in accordance with the present invention.

However, the baffle is also movable to a second position, in which the baffle is located in the mouth region such that the throat region is presented to the first flow zone to receive the flow (instead of the entrance aperture of the mouth region). In this arrangement, the flow through the ventilation inlet is reduced relative to the arrangement in which the baffle is located in the first position.

Thus, during engine conditions where high flow is required to purge the second flow zone (e.g. the nacelle cavity) the baffle is locatable in the first position. The ventilation inlet can be designed such that this arrangement provides sufficient flow to meet the regulatory requirements, for example. Whereas, when (relatively) lower flow through the ventilation inlet is desirable the baffle can be moved to the second position so as to restrict the flow through the ventilation inlet; thereby minimizing the aforementioned disadvantageous effects on specific fuel consumption and the propulsive efficiency of the engine.

The conduit preferably has a central axis extending generally in the direction of flow through the conduit. Where the conduit is an elongate conduit, the long axis of conduit and the central axis of the conduit may be co-axial. The baffle may be arranged to extend at least partially circumferentially around the central axis, and to extend radially inwards to define the throat region in a central region of the conduit.

The baffle may include a liner extending, at least partially, circumferentially around the central axis to line at least a portion of the conduit.

The baffle (e.g. the liner) may include a radially inwardly projecting collar, the collar defining the throat region. The collar is preferably disposed at the end of the baffle (e.g. liner) closest to the first flow zone (i.e. closest to the entrance aperture). The collar may define a throat aperture. The throat aperture preferably replaces the entrance aperture of the mouth region when the baffle is in the second position. The throat aperture is smaller than the entrance aperture. For example, the cross sectional area of the throat aperture is smaller than that of the entrance aperture, as experienced by the flow flowing through the ventilation inlet.

The ventilation inlet according to the present invention may further include an actuator arranged to move the baffle along the conduit. When the actuator is inactive, the baffle is preferably arranged to reside in the first position. Therefore, the passive arrangement of the ventilation inlet is preferably the arrangement which maximises the flow through the ventilation inlet.

In response to a first activation operation, the actuator is preferably arranged to move the baffle from the first position to the second position, to reduce the flow through the ventilation inlet. Preferably, the actuator is arranged to return the baffle to the first position when the first activation operation ends. Preferably, the actuator is arranged to return the baffle to the first position automatically when the first activation operation ends, i.e. without the need for a second activation operation to be performed. The return of the baffle to the first position by the actuator is therefore preferably automatically performed in response to the first operation ending. Thus, the ventilation inlet is preferably a failsafe ventilation inlet, as discussed below.

The baffle may be coupled, directly or indirectly, to the conduit via the actuator.

The actuator may be formed of a shaped memory alloy, such that raising the temperature of the actuator to above a suitable trigger temperature causes the actuator to move the baffle.

The actuator may be formed of a piezoelectric material, such that application of a suitable electrical signal to the actuator causes the actuator to move the baffle.

The actuator may be formed of a material having a high thermal growth coefficient, in other words a material which expands (or contracts) significantly in response to the application of heat, such that application of heat to the actuator causes movement of the baffle. The actuator could be a metallic material, or an artificially created material such as a nanomaterial that gives exceptional thermal growth. The metallic material of preference is a shape memory alloy, as is known to those in the relevant art.

Such actuators are compact, easily controllable and do not require large or heavy components for their operation. Thus, existing ventilation inlets could easily be retro-fitted with a baffle and actuator to resemble a ventilation inlet according to the present invention.

The flow referred to herein may be ventilation flow, e.g. fluid flow. For example, the ventilation flow may be a flow of air.

The inner surface of the conduit and/or the outer surface of the baffle (e.g. liner) may engage. Therefore the inner surface of the conduit and/or the outer surface of the baffle (e.g. liner) may be coated in a material having a coefficient of friction which is lower than titanium to facilitate smooth relative movement between the baffle (e.g. liner) and conduit; for example the coating material may be PTFE.

The baffle is preferably arranged to be incapable of blocking the flow completely. Thus, the baffle of the present invention should not be considered to be a stop valve, or an on/off valve.

In another aspect, the present invention provides a gas turbine engine comprising a ventilation inlet as described herein, wherein the first flow zone is provided in a bypass duct. The second flow zone may be provided in a fire zone, or nacelle cavity of the gas turbine engine.

In another aspect, present invention provides a method of assembling a gas turbine engine, including the step of incorporating a ventilation inlet, according to any aspect or embodiment described herein, into the gas turbine engine. For example, incorporating the ventilation inlet to be capable of conveying flow from a bypass duct to a nacelle cavity, or fire zone.

The method of assembling a gas turbine engine also encompasses a method of retrofitting a ventilation inlet, according any aspect or embodiment described herein, into the gas turbine engine.

BRIEF DESCRIPTION OF THE DRAWINGS

Embodiments of the invention will now be described by way of example with reference to the accompanying drawings.

DETAILED DESCRIPTION OF EMBODIMENTS

In the following description, the present invention will be described in the context of a ventilation inlet arranged in a gas turbine engine to convey air from a bypass duct to a nacelle cavity, or fire zone. However, the invention should not be considered to be limited to this context, unless specifically required by the features of the claims.

Figure 3:
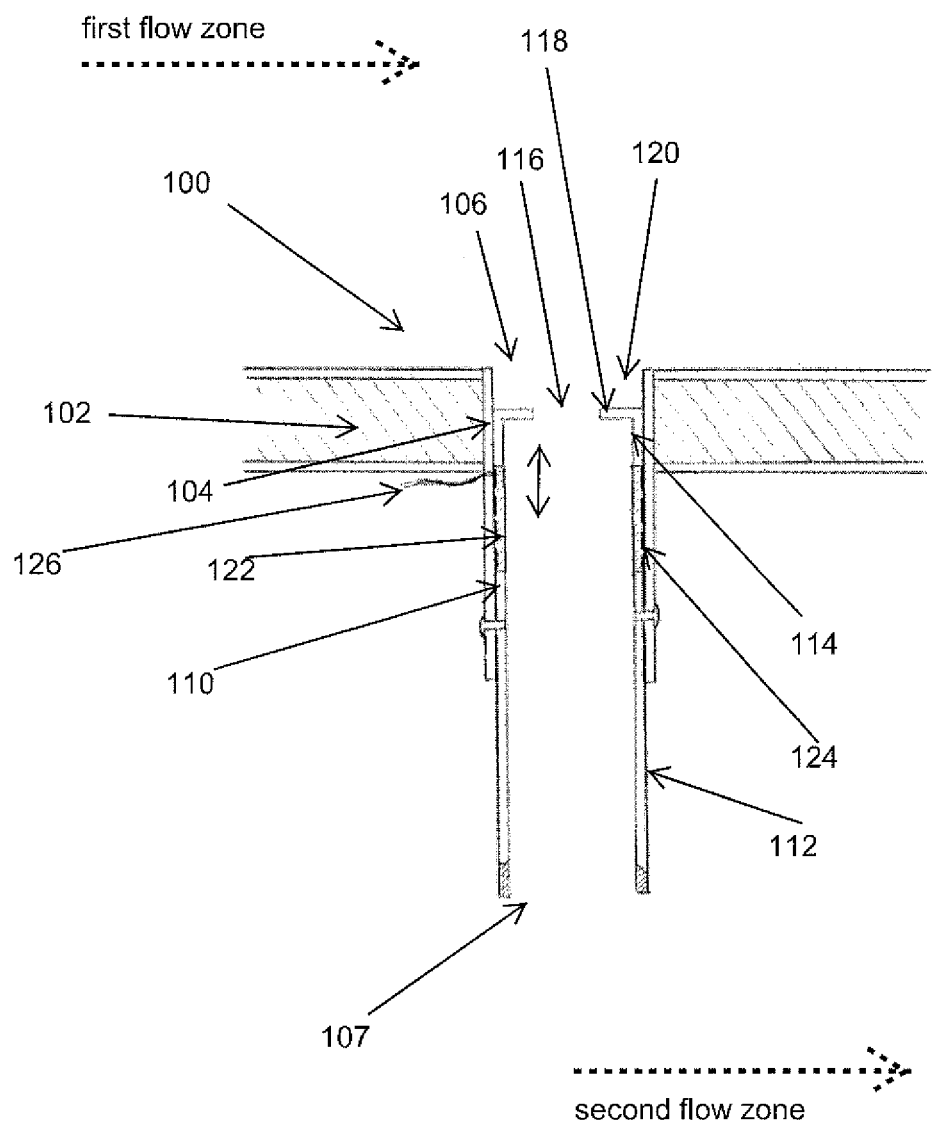
FIG. 3 shows a cross section of a first embodiment of a ventilation inlet according to the present invention.

FIG. 3 shows a first embodiment of a ventilation inlet 100 of the present invention. Ventilation inlet 100 is provided to convey air flow from the first flow zone to the second flow zone. The first flow zone is typically located in a bypass duct of a gas turbine engine, and the flow typically flows from left to right as indicated by the dashed arrow. The second flow zone is typically located in a nacelle cavity, or fire zone, of the gas turbine engine. The first and second flow zones are separated by the bypass duct inner wall 102.

Figure 1:
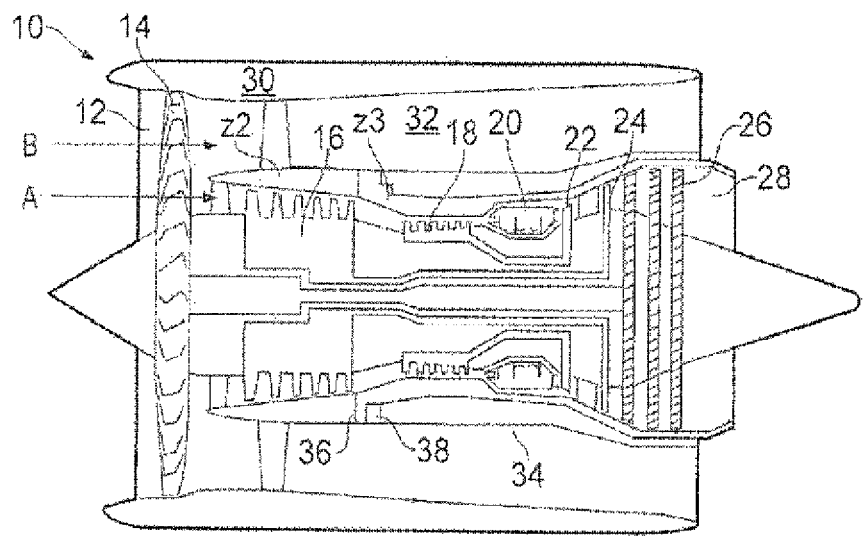
FIG. 1 shows a gas turbine engine to which the present invention is applicable.
Figure 2:
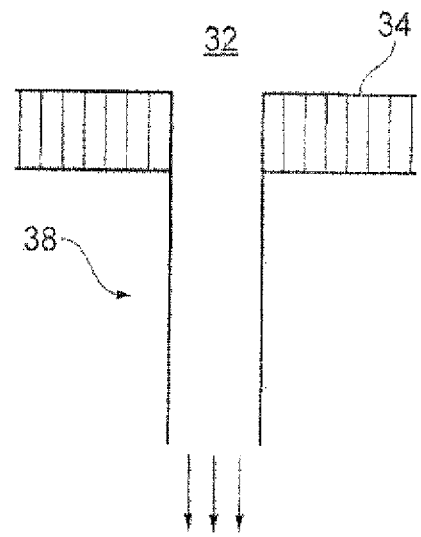
FIG. 2 shows a prior art ventilation inlet.

The inlet 100 includes a conduit 104 rigidly fixed to the bypass duct inner wall 102. The conduit 104 can be considered to be static relative to the wall 102. The conduit 104 itself may be a prior art conduit similar to that shown in FIG. 2 for example.

The conduit 104 is typically a hollow tube or pipe. Conduit 104 defines an entrance aperture 106 for receiving flow from the first flow zone. A flow regulating assembly 110 is provided to control the flow of air through the ventilation inlet. The ventilation inlet provides an exit aperture 107 for delivering the flow to the second flow zone.

In this embodiment, the flow regulating assembly 110 comprises a static liner element 112, rigidly fixed to the conduit 104 to be immovable relative to the conduit 104. For example, static liner element 112 may be bolted or riveted to the conduit 104. Liner element 112 is typically a hollow tube, concentrically mounted within the conduit. Typically the outer dimensions of the liner element 112 correspond with the inner dimensions of the conduit 104.

Liner element 112 may extend axially beyond the conduit to deliver the flow to the second flow zone. Or, the conduit may extend axially beyond the liner element 112 to deliver the flow to the second flow zone. Thus, either the liner element 112 or the conduit 104 may provide the exit aperture 107.

Flow regulating assembly 110 also includes a baffle 114 located within the conduit 104. Baffle 114 typically lines a portion of the inner surface(s) of the conduit 104. For example, baffle 114 may be a hollow tube having dimensions suitable for lining (a portion) of the conduit 104. Thus, typically the outer dimensions of the baffle 114 correspond with the inner dimensions of the conduit 104.

The inner dimensions of the baffle 114 define a throat region which is smaller than the entrance aperture defined by the inner dimensions of the conduit 104. In other words, baffle 114 defines a throat aperture 116 which is smaller than the entrance aperture of the conduit 104. The flow passes through the throat 116.

If desired, baffle 114 can be provided with a radially inwardly projecting collar 118, to define the throat aperture 116, without the need for a thick walled baffle 114 extending along the conduit. Advantageously, use of a collar therefore allows for a suitably narrow throat region (throat aperture 116) to be defined, whilst minimising the addition of unnecessary mass to the assembly 110.

With or without a collar 118, when viewed in cross-section, as in FIG. 3 for example, baffle 114 is arrangeable in the conduit 104 to be recessed from the entrance aperture 106.

The region between the baffle 114 and the entrance aperture 106 therefore provides a mouth region for receiving flow from the first flow zone via the entrance aperture 106.

When viewed in cross-section, as in FIG. 3, this arrangement creates a step (i.e. in the region labelled 120 in FIG. 3). Indeed, this arrangement can be thought of as providing an inlet aperture (i.e. throat aperture 116) located in the floor of a recess which is relatively wider than the inlet aperture.

In other words, the inlet aperture (i.e. throat aperture 116) is mounted under-flush relative to the air-washed surface of the bypass duct wall (in the first flow zone).

The present inventors have discovered that this arrangement yields a significant increase in the flow through the ventilation inlet, relative to a similar ventilation inlet which does not include the flow regulating assembly 110. It is believed that this phenomenon is associated with the nature of the flow into the mouth region 120. With a prior art inlet (such as that shown in FIG. 2) the flow into the inlet aperture has an acute angle relative to the conduit and this can act to restrict the flow.

However, by providing an entrance aperture 106 (of the same diameter as a prior art inlet aperture) together with the recessed throat aperture 116, the flow is able to turn before entering the throat aperture 116 and so presents itself to the throat aperture at a less acute angle. This provides a higher flow, by approximately 20%.

Baffle 114 is coupled to element 112 by movement actuator 122. Actuator 122 is configured to be capable of moving baffle 114 relative to element 112, and therefore relative to entrance aperture 106. Movement actuator 122 may be provided as a component part of flow regulating assembly 110, e.g. as an intermediate body between the baffle 116 and static liner element 112; this is shown in FIG. 3. As such, actuator 122 is located within the conduit 104 in this embodiment.

In a first principal configuration of the ventilation inlet, for example when a relatively high, of a maximum, flow is required, actuator 122 is controllable to maintain mouth region 120 by retaining baffle 114 in the withdrawn (or recessed) position relative to the entrance aperture. In this configuration, relatively high flow through the ventilation inlet is produced for the reasons given above.

However, in another configuration, when relatively low flow through the ventilation inlet is desired, e.g. for the aforementioned reasons, actuator 122 is controllable to move baffle towards the entrance aperture and thereby to reduce the size of mouth region 120, thereby restricting the flow through the ventilation inlet 100. The size of mouth region 120 is reduced in the sense that the depth, not the width, of the mouth is reduced. The depth of the mouth being the perpendicular distance between the entrance aperture 106 and the throat aperture 116.

In a second principal configuration, actuator 122 may be controlled to move baffle 114 so as to completely fill (i.e. eliminate) mouth region 120, so that baffle 114 is made to be flush with (or even over flush with, i.e. proud of) the surface of the bypass duct wall in the first flow zone. This has the effect of replacing the entrance aperture 106 with throat aperture 116. In other words, in this configuration, throat aperture 116, not entrance aperture 106 is presented to the first flow zone to receive flow therefrom. This second principal configuration reduces the flow through the ventilation inlet 100 relative to the first principal configuration.

In an aspect, the present invention proposes the use of Shaped Memory Alloy (SMA) as a suitable actuator for moving the baffle 114. SMA materials are materials which can change shape dramatically when heated to above a predetermined trigger temperature. Thus, the SMA actuator can be made to react (by changing shape) in a predetermined way in response to the application of heat, so as to control the position of the baffle 114 within the conduit 104.

By such a mechanism, control over the level of flow (within defined bounds) could be achieved both at a system wide level (across multiple inlets) and on an individual inlet basis.

In the present embodiment, control of the location of the baffle is achieved through the use of the SMA within part of the flow regulating assembly 110 wall in such a way that heat application would result in either lengthening or shortening of the overall inlet tube.

For example heating element 124 could be provided within (e.g. a wall of) flow regulating assembly 110; heating element 124 could alternatively be provided around the externally surface of the SMA actuator 122, for example radially between the flow regulating assembly 110 and the conduit 104. Electrical wires 126 may be provided to supply suitable power to heating element 126. Alternative suitable means for heating the SMA material could be provided.

The important point is that the SMA actuator 122 is reliably and controllably heatable to above its trigger temperature, such that the SMA actuator 122 can be made to change shape and move the baffle in a predetermined way.

Figure 4:
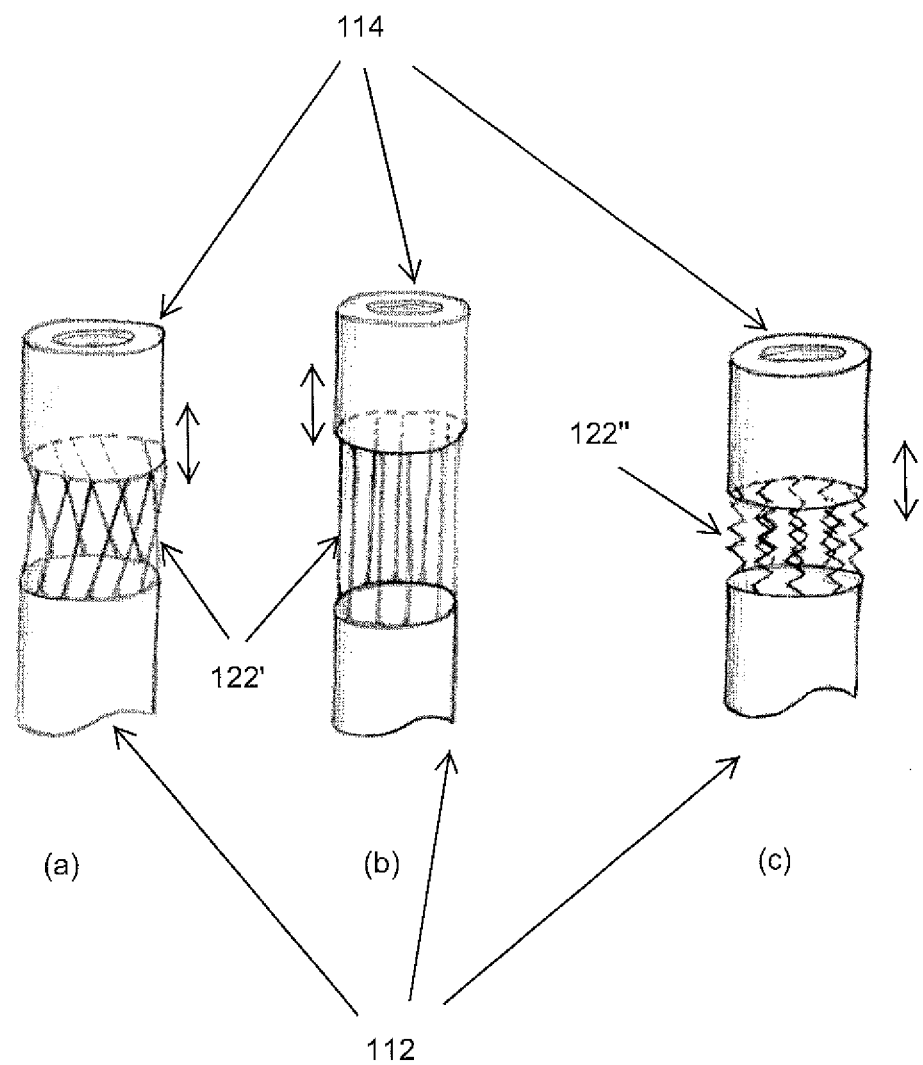
FIG. 4 shows various examples of a movable baffle suitable for use in a ventilation inlet according to the present invention.

FIG. 4 shows two examples of suitable configurations of SMA elements 122' and 122" provided in flow regulating assemblies 110 according to the present invention.

FIG. 4(a) shows a baffle 114 coupled to a static liner element 112 via a series of elongate SMA elements 122'. SMA elements 122' are arranged in a spiral form, about the principal (i.e. the long or central) axis of the flow regulating assembly, so as to separate physically the baffle 114 from the static liner element by a predetermined distance. The SMA elements 122' adopt this form when their temperature is below the trigger temperature. By applying heat, to take the SMA elements 122' above their trigger temperature, the SMA elements 122' can be made to change shape.

For example, as shown in FIG. 4(b) the spiral form of the SMA elements 122' may be caused to uncoil, and instead to extend generally parallel to one another and parallel to the principal axis of the flow regulating assembly. As will appreciated, this uncoiling of the spiral form causes the baffle 114 to move away from the static liner element 112, and therefore increases the distance the static liner element 112.

So, for example, FIG. 4(a) may represent the configuration of the assembly 110 within a ventilation inlet 100 when the assembly 110 is in the first principal configuration discussed above; whereas FIG. 4(b) may represent the configuration of the assembly 110 within a ventilation inlet 100 when the assembly 110 is in the second principal configuration discussed above. In other words, heating the SMA elements to above their trigger temperature may change the configuration of the ventilation inlet from the first principal configuration to the second principal configuration. In general, activating the actuator preferably changes the configuration of the ventilation inlet from the first principal configuration to the second principal configuration An alternative arrangement for the SMA elements is shown in FIG. 4(c) where each individual SMA element 122" may adopt a respective corrugation (or concertina) form when its temperature is below the trigger temperature. By applying heat to take the SMA elements 122" above the trigger temperature, the elements SMA 122" can be made to change shape to adopt a (more) linear form, as shown in FIG. 4(b), with the same consequences as described above. The corrugations would have to be restricted in size to ensure an absence of interference of the flow within the inlet tube. This would necessitate preferentially a large number of small corrugations rather than a small number of large corrugations.

The respective flow regulating assemblies shown in FIG. 4 can be incorporated into the ventilation inlet shown in FIG. 3. In such a configuration, heating the SMA elements above the trigger temperature causes the baffle 114 to move along the conduit towards entrance aperture 106. Furthermore, by cooling the SMA elements to below the trigger temperature, the SMA elements can be caused to adopt their original form, resulting in the baffle being withdrawn into the conduit 104.

The heating elements required to heat the SMA elements could be embedded either in the SMA material or, as discussed above, in the surrounding structure. They could be provided in the form of fine copper wire, or tract, to elevate the SMA thermally above its trigger temperature.

By removing the heat (specifically: lowering the temperature of the SMA elements below the trigger temperature) the SMA can be caused to return to its original shape, hence removing the necessity for a positive return mechanism within the ventilation inlet. In other words, as the SMA elements cool to below the trigger temperature they automatically adopt their original shape and thus return the baffle 114 to its original position (e.g. the first principal configuration).

The ventilation inlet may include a guide member (not shown) to separate the cold fluid, e.g. air, flowing through the inlet from the SMA elements so as to prevent interference with the heating process. Functionally, this can be thought of as a sleeve member for at least partially housing the SMA element(s), so that as the SMA element(s) are caused to change form (by bending, shrinking, kinking, coiling, de-coiling etc) the SMA elements can slide within the sleeve member as they contract/expand.

A way to simplify structural integration of the heater elements into the system would be to print Printed Circuit Board (PCB) material directly on the SMA over which copper heating elements could be printed. This ensures electrical isolation between the heater element and the SMA. Current lead outs from the heater element could then have either conventional wires soldered on leading to a power supply or continuation of the PCB track on the inner surface of the bypass duct wall.

If the latter of these two configurations was to be selected, each inlet system could be interfaced with the power supply via the means of a hot shoe connection. The inlet tube is likely to be a separate device from the bypass duct inner wall, and the inlet tube is likely to be pushed into it. If, at the location where the tube is pushed in (and bolted down), power can also be provided to the heating element, via a powered contact (the hot shoe), this would eliminate the need to wiring the system in. If it became damaged a replacement can simply be installed by unbolting one and re-bolting another. A possible complication with this approach is getting power to the particular location, but if power wires were to take the form of PCB copper tracks and these were to be integrated into the inner fixed structure composite by placing the track in-between the composite weave layers, the track would be protected and integrated, significantly reducing the number of parts.

Inherent within the proposed invention is the ability to modulate the flow through a series of ventilation inlets on an individual inlet basis. Such a system would allow the redistribution of flow and hence cooling to the cavity over and above simple modulation of the total air into the cavity. Such a system would not require feedback for it to operate if the thermal characteristics of key accessories or components had been pre-determined. This would significantly increase the simplicity of the system, reducing cost and increasing reliability.

Figure 5:
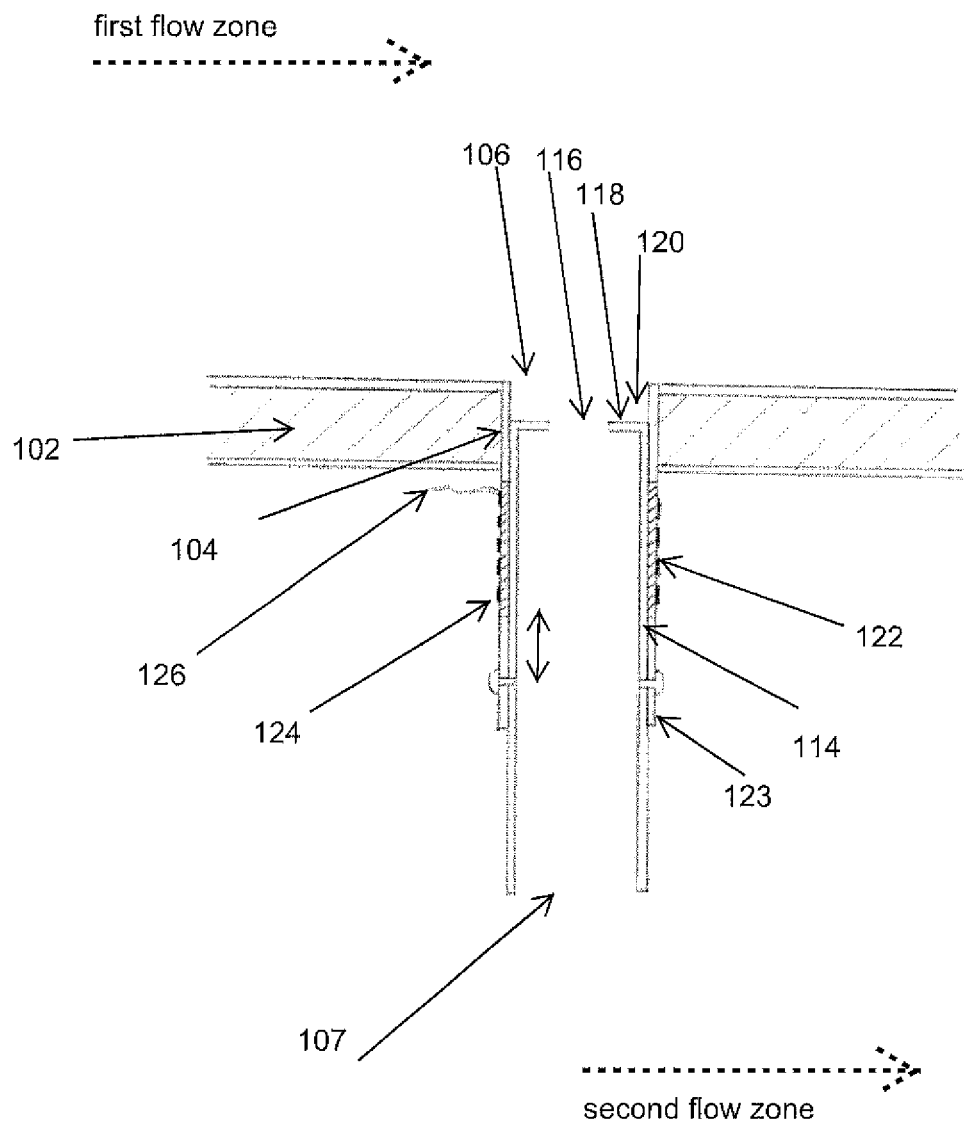
FIG. 5 shows a cross section of a second embodiment of a ventilation inlet according to the present invention.

A second embodiment of the present invention is shown in FIG. 5. Features which are common to the two embodiments are not discussed again repeated for the sake of brevity. In particular, but not exclusively, the baffle 114, the conduit 104, the bypass duct wall in this embodiment, and indeed any other embodiment, can be as described for the first embodiment. Indeed, the general principles described above in relation to the first embodiment apply to this second embodiment, and any other embodiment. However, the particular configuration of the actuator may be different to that of the first embodiment.

In particular, it is preferred in the first embodiment that heating the SMA elements above the trigger temperature causes the SMA elements to push the baffle towards the first flow zone (i.e. towards the entrance aperture) from its rest position, for example by lengthening the SMA elements. However, in this second embodiment it is preferred that heating the SMA elements above the trigger temperature causes the SMA elements to pull the baffle towards the first flow zone (i.e. towards the entrance aperture) from its rest position, for example by shortening the SMA elements.

Thus, in this embodiment, conduit 104 is similar to conduit 104 of the first embodiment, but it is typically shorter than the conduit 104 in the first embodiment. Conduit 104 is typically directly coupled to the actuator 122. The actuator 122 is coupled to the baffle 114, for example via intermediate body 123, to be capable of moving the baffle along at least a portion of the length of the conduit 104 when activated.

In this embodiment, actuator 122 is typically provided in the form of SMA elements. The SMA elements extend from the end of the conduit which is distal to the first flow zone. The SMA elements are provided circumferentially around a portion of the length of the baffle 114. Intermediate body 123 may be a sleeve extending circumferentially around the baffle 114. Intermediate body 123 is rigidly fixed to the baffle 114. The SMA elements couple the intermediate body 123 to the conduit 104.

Heating the SMA elements above the trigger temperature causes the intermediate body to move, relative to the conduit 104 (and thus relative to the bypass duct wall 102); and in turn the baffle is therefore caused to move within the conduit, preferably towards the first flow zone.

In this embodiment, it is preferred that heating the SMA elements to above the trigger point causes the SMA elements to shorten rather than lengthen. Thus, when the SMA elements are below the trigger point, they are relatively long and hold the baffle in the conduit to be withdrawn (or recessed) relative to the entrance aperture of the conduit 104. When heated to above the trigger point, the relatively shortened SMA elements pull the baffle 114 towards the entrance aperture 106, and preferably locate the baffle to be flush with the bypass duct wall 102, such that the throat aperture 116 is presented to the first flow zone to receive the flow therefrom instead of the entrance aperture.

The heating elements 124 for heating the SMA elements are similar to that described in the first embodiment. Advantageously, however, in this embodiment, the SMA elements and the heating elements 124 are isolated from the cold fluid, e.g. air, flowing through the ventilation inlet because they are located around the external surface of the baffle 114, which serves, in this embodiment to convey the flow to the second flow zone.

Figure 6:
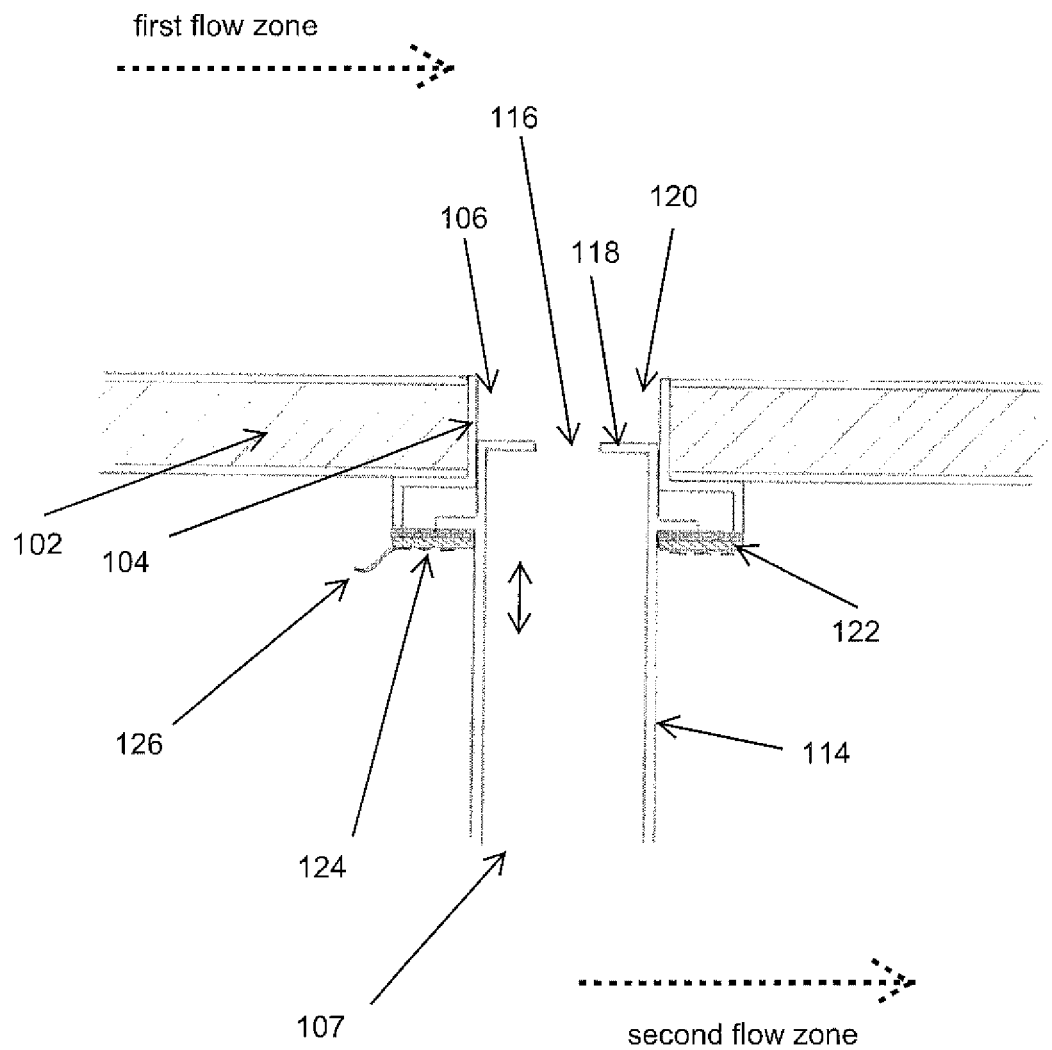
FIG. 6 shows a cross section of a third embodiment of a ventilation inlet according to the present invention.

In yet another alternative embodiment, shown in FIG. 6, the actuator 122 may not include SMA elements, but includes a bimetallic strip. The bimetallic strip is coupled to a static element 130 which is immovably coupled to the bypass duct wall 102. The bimetallic strip is also coupled to the baffle 114, which is movable within the conduit 104. In this embodiment, conduit 104 may only extend longitudinally to a length equivalent to the thickness of the wall 102.

Heating element 124 is provided for heating the bimetallic strip.

Heating the bimetallic strip causes the bimetallic strip to flex. The bimetallic strip is arranged such that flexing the bimetallic strip causes the baffle 114 to move along the conduit. Preferably, when the bimetallic strip is unheated, the baffle 114 is located within the conduit to be recessed (or withdrawn) from the entrance aperture of the conduit. Preferably, applying heat to the bimetallic strip causes the baffle to move along the conduit towards the first flow zone. Preferably, so that the baffle is located to be flush (or over flush) with the bypass duct wall, such that the throat aperture 116 is presented to the first flow zone to receive flow therefrom, instead of the entrance aperture 106.

In other embodiments, the actuator 122 may be provided by means other than SMA elements or bimetallic strips. For example, in a preferred alternative embodiment, actuator 122 may be provided as a piezoelectric element, responsive to the application of a voltage to move the baffle 114 within the conduit 104. Advantageously, piezoelectric elements do not rely on the application of heat, and therefore will be less affected by the cold fluid, e.g. air, flowing through the ventilation inlet than SMA elements and/or bimetallic strips.

Other suitable actuators 122 may be provided in the form of linear or non-linear motors, electromagnetic actuators, pressure balance systems, hydraulic actuators, pneumatic actuators, spring balance systems or inflatable bladders.

However, the use of SMA elements, piezoelectric actuators or bimetallic strips as the actuator 122 is preferred.

Nevertheless, in all embodiments, the preferred arrangement is for the baffle 114 to be in the withdrawn (or recessed) state when the actuator is inactive, such that the entrance aperture 106 is presented to the first flow zone to receive flow therefrom. Activation of the actuator 122 therefore preferably moves the baffle to be flush with (or even over flush relative to) the surface of the bypass duct wall in the first flow zone, so that throat aperture is presented to the first flow zone to receive flow therefrom, instead of the entrance aperture. Thus, activation of the actuator results in a reduction of the flow. Activation would occur at high thrust conditions where less ventilation flow in the second flow zone would be beneficial for the aforementioned reasons.

Furthermore, as activation of the actuator is required to reduce the flow through the ventilation inlet, failure of the actuator, or its control system, would result in deactivation of the actuator (i.e. the actuator becoming inactive). Consequently, the baffle would be (automatically) withdrawn into the conduit, to be under flush with the surface of the bypass duct wall in the first flow zone. Accordingly, the flow through the ventilation inlet would increase, and provide a safe ventilated condition, rather than a potentially unsafe under-ventilated system. In essence, it is a fail-safe system by design.

For the avoidance of doubt, in all embodiments the baffle 114 may include the collar 120, further defining the throat aperture 116.

In a gas turbine engine, there are provided multiple ventilation inlets between the bypass duct and one or more fire zones, or nacelle cavities. The location of the baffle in each respective ventilation inlet could be controlled individually to provide cooling where it is needed most, whilst optimizing the specific fuel consumption of the engine as a whole.

It is to be noted that all figures herein show the assumed preferable geometry in which the baffle 114 and conduit 104 are axi-symmetric (or, the entrance aperture 106 and throat aperture 116 are axi-symmetric). However, the entrance aperture 106 need not be formed to be the same shape as the throat aperture 116. The entrance aperture 106 could be any shape: oval, triangular, square, oblong etc. Also, the throat aperture could be provided upstream or downstream (with reference to the direction of flow of the fluid in the first flow zone) relative to the principal axis of the conduit. The principal axis of the conduit is the central axis of the conduit extending along the length of the conduit in the general direction of flow through the conduit.

We claim:
1. A ventilation inlet comprising:
a conduit arranged to convey flow from a first flow zone to a second flow zone, the conduit having a mouth region presenting to the first flow zone an entrance aperture to receive the flow therefrom;

a baffle spanning a portion of the conduit to define a throat region, the throat region being narrower than the entrance aperture; and
an actuator configured to actively move the throat region along the conduit controlling the flow through the ventilation inlet in response to an electrical control signal received by the actuator.

2. The ventilation inlet according to claim 1, wherein the baffle is movable along the conduit.

3. The ventilation inlet according to claim 1, wherein the baffle is movable along a general direction of flow in the conduit.

4. The ventilation inlet according to claim 1, wherein the baffle spans transversely across a portion of the conduit.

5. The ventilation inlet according to claim 1, wherein the baffle is locatable in a first position, in which the baffle is located downstream of the mouth region so that the throat region is recessed from the entrance aperture.

6. The ventilation inlet according to claim 1, wherein the baffle is movable to a second position, in which the baffle is located in the mouth region so that the throat region is presented to the first flow zone to receive the flow instead of the entrance aperture of the mouth region.

7. The ventilation inlet according to claim 1, wherein the conduit has a central axis extending generally in a direction of flow through the conduit.

8. The ventilation inlet according to claim 7, wherein the baffle is arranged to extend at least partially circumferentially around the central axis, and to extend radially inwards to define the throat region in a central region of the conduit.

9. The ventilation inlet according to claim 7, wherein the baffle includes a liner extending, at least partially, circumferentially around the central axis to line at least a portion of the conduit.

10. The ventilation inlet according to claim 8, wherein the baffle includes a radially inwardly projecting collar, the collar defining the throat region.

11. The ventilation inlet according to claim 1, wherein when the actuator is inactive, the baffle is arranged in a first position, in which the baffle is located downstream of the mouth region so that the throat region is recessed from the entrance aperture.

12. The ventilation inlet according to claim 1, wherein:
the baffle is locatable in a first position, in which the baffle is located downstream of the mouth region so that the throat region is recessed from the entrance aperture;
the baffle is movable to a second position, in which the baffle is located in the mouth region so that the throat region is presented to the first flow zone to receive the flow instead of the entrance aperture of the mouth region; and
in response to a first activation operation, the actuator is arranged to move the baffle from the first position to the second position, to reduce the flow through the ventilation inlet.

13. The ventilation inlet according to claim 1, wherein the baffle is coupled, directly or indirectly, to the conduit via the actuator.

14. The ventilation inlet according to claim 1, wherein the actuator includes a heating element that heats the actuator in response to the electrical control signal, the actuator is formed of:
a shaped memory alloy (SMA), such that raising a temperature of the (SMA) to above a trigger temperature of the (SMA) causes the actuator to move the baffle; or
a piezoelectric material, such that application of a suitable electrical signal to the piezoelectric material causes the actuator to move the baffle.

15. The ventilation inlet according to claim 1, wherein the flow is ventilation flow.

16. The ventilation inlet according to claim 1, wherein the baffle is arranged to be incapable of blocking the flow completely.

17. A gas turbine engine comprising the ventilation inlet as claimed in claim 1, wherein the first flow zone is provided in a bypass flow duct.

18. The gas turbine engine according to claim 17, wherein the second flow zone is provided in a fire zone, or nacelle cavity.

19. A ventilation inlet comprising:
a conduit arranged to convey flow from a first flow zone to a second flow zone, the conduit having a mouth region presenting to the first flow zone an entrance aperture to receive the flow therefrom;
a baffle spanning a portion of the conduit to define a throat region, the throat region being narrower than the entrance aperture; and
a piezoelectric actuator configured to receive an electric signal and actively move the throat region along the conduit controlling the flow through the ventilation inlet, in response to the received electric signal.

* * * * *